3,345,183
PROCESS FOR PRODUCING READY-TO-EAT OAT CEREALS

Edward F. Lilly, Dundee, and Robert R. Reinhart, Des Plaines, Ill., assignors to The Quaker Oats Company, Chicago, Ill., a corporation of New Jersey
No Drawing. Filed May 18, 1964, Ser. No. 368,328
5 Claims. (Cl. 99—80)

ABSTRACT OF THE DISCLOSURE

Storage stable ready-to-eat cereal is produced from oat groats by subjecting cooked groats to kneading at 150° to 212° F. to convert the groats into a cooked dough, shaping the dough, drying, and toasting the resulting cereal shapes.

---

This invention relates to the preparation of ready-to-eat oat products.

A major use for this invention is the manufacture of ready-to-eat oat flakes having good flavor and texture as well as improved storage stability.

Oats are unique among the cereal grains in that the oat products contain a comparatively high level of fat. In the normal processing of corn and wheat the level of fat is usually lowered during milling by degermination, etc. Oat cereals, however, are equivalent to whole-grain products. Consequently oat products, if improperly processed, tend to be unstable during storage. It has been suggested, for example, that ready-to-eat oat flakes be prepared by cooking oat groats and flaking the cooked groats. This product exhibits poor keeping qualities. The keeping qualities have been improved somewhat by a later suggestion that oat flour be used to form cooked dough pellets which were subsequently flaked and toasted. However, the keeping qualities of this product left much to be desired, and it was further suggested that a defatted flour be used in such a process to improve the storage stability.

An object of this invention is to provide a process by which a ready-to-eat cereal may be produced without the necessity of reduction of the grain berry to flour before its use.

A further object of this invention is to provide a process by which a ready-to-eat oat flake having good flavor and texture as well as storage stability may be produced without the necessity of reduction of the oat groat to flour before its use.

Another object of this invention is to provide a ready-to-eat oat product which utilizes the whole groat.

It is a further object of this invention to provide a process for preparing stable, ready-to-eat oat cereals by which varying degrees of blistering may be accomplished.

These and other objects which will be apparent from the following are accomplished by a process comprising cooking oat groats and kneading the cooked oat groats at a temperature between about 150° F. and 212° F., thereby forming a cooked dough. (By "oat groats" is meant whole or cut oat groats, as distinguished from oat flour.) The cooked dough is then formed and toasted to give the ready-to-eat product.

The oat groats are cooked in any conventional manner until the starch is gelatinized. Although the cooking step may be carried out in such a manner that the groats become largely disintegrated, it is preferred that cooking be accomplished by any method which maintains the substantial integrity of the berry structure.

A preferred method for cooking oat groats comprises pressure-cooking the whole or cut groats at a pressure less than about 25 p.s.i.g., preferably at about 15 p.s.i.g., until the groat is cooked, as determined by the gelatinization of the starch. In the preferred pressure-cooking embodiment, water is present in an amount less than that amount necessary to provide a substantial unabsorbed water phase. When the pressure cooking is carried out in accordance with this preferred embodiment of this invention, the oat groat structure substantially retains its integrity throughout the cook, and the cooked oat groats, though moist to the touch, are readily handled and comparatively free flowing. The moisture content of the cooked oat groats may be between about 35% and 52% but are preferably between about 40% and 43% by weight and upon discharge from the cooker. If the cooked oat groats are conveyed from the cooker to the kneader or extruder, the moisture content drops somewhat so that the cooked grain pieces being fed into the kneader or extruder have a somewhat lower moisture content, preferably between 30% and 47%, more preferably between about 35% and 40%. The groats are then kneaded, preferably in an extruder, under temperature conditions such that the resulting cooked dough is discharged from the extruder at a temperature between about 150° F. and 212° F., preferably between about 190° F. and 210° F. Though high pressures may be used in the extruder, low pressures, e.g., less than 500 p.s.i.g., are preferred. These low pressures produce a desirable dough which is not entirely homogeneous. In addition to containing discrete particles of bran and germ, this desirable heterogeneous dough contains some small portions of the original cooked grain berries. Upon cutting and flaking, etc., the heterogeneous doughs are found to provide a flake having an appearance reminiscent of its wholesome whole-grain origins, and a texture which has been found to be highly acceptable in organoleptic studies. More strenuous extruder conditions lead to a more homogeneous dough. These more homogeneous doughs produce flakes which, though nutritious and desirable, have much less "character" than those made from the heterogeneous doughs.

In the manufacture of a ready-to-eat oat flake the extruded dough may be cut into pellets and immediately rolled into flakes, for example into flakes having a thickness of .008 to .015 inch, preferably between about .011 and about .012 inch. In the manufacture of ready-to-eat oat flakes it has been found that the time lapse between the extrusion of the dough and the flaking is preferably less than two minutes, and more preferably in the order of seconds. The cereal flakes are then tempered, i.e., dried, to a moisture content between about 12% and about 30%, depending on the degree of blistering desired in the final product. In order to produce a product having a high degree of blistering, the flakes are tempered to a moisture content between about 18% and 30%, preferably between about 18% and 22% moisture. When it is desired that the final product have less blistering and be more suited to enrobing or coating treatments, the moisture content should be between about 12% and 18%, preferably between about 12.0% and 15.0% after the tempering. This tempering may be carried out in any conventional drying equipment, as for example, in a conveyor-type oven having 250° F. air in and 250° F. air out. Under these conditions flakes having a moisture between about 32% and 34% at the flaking rolls are generally tempered to 13% to 14% moisture in about 2¼ minutes.

The tempered flakes are then subjected to flash drying by contacting the flakes with air at a temperature between about 400° and 800° F. Flash dryer air temperatures between about 400° F. and about 600° F. are preferred when a product having a low degree of blister is preferred. Temperatures between 600° F. and 800° F. are preferred in manufacture of product having a high degree of blister. Flakes are permitted to remain in contact with air at flash dryer temperatures for a sufficient time to lower the moisture content to between about 2% and 10%, more preferably to between about 5% and 8%. A flash drying system which is eminently satisfactory for use in this process is a hot-air pneumatic conveyor from which the flake is removed by a cyclone-type separator. In this flash drying system, suitable flake residence times are in the general order of 10 to 15 seconds. Longer or shorter residence times may be utilized, depending on the initial and final moistures.

The final drying step, if employed, may be accomplished by use of conventional drying equipment, such as a conveyor-type oven having 300° F. air in and 300° F. air out, in which, for example, a 1¼-inch thick bed of flakes is retained approximately 2¼ minutes. The final product moisture, however, must be below about 3%.

The invention is further illustrated but is not to be limited by the following examples, in which parts are parts by weight and percents are percent by weight based on the "as is" sample weight.

Example 1

Fifty parts of oat groats and 20 parts of water were charged to a pressure cooker and cooked for one hour and 45 minutes at 15 p.s.i.g. The charged amount of water merely wets the groats. The cooked groats contained 51.6% water at the end of cooking. At the end of the cook, the groats had the appearance of being moist but were generally intact. There was substantially no water phase present in the cooker at the end of the cook. The moisture content was lowered to about 36.4% during rapid cooling of the cooked grain during conveying. The grain was then fed into a single screw extruder equipped with electric heating coils along the jacket and a ⅛-inch round-hole die on the discharge. This produced a dough rope which was about 3/16 inch in diameter. Cooling water was applied to the feed section of the jacket. The external heating means were divided into two zones along the length of the extruder barrel. A temperature of approximately 200° F. to 250° F. was maintained in the jacket of the first zone, and a temperature of about 360° F. was maintained in the jacket in the second zone. The extruder was operated at about 60 r.p.m., giving an approximate retention time of one minute in the extruder. The maximum dough temperature was reached just before the dough passed through the die and fluctuated closely about 160° F. The rope or extrudate was immediately cut into pellets 3/16 to ¾ inch in length. These pellets were immediately deposited in a room-temperature pneumatic material-handling system, and they reached the flaking rolls in about 1¼ seconds, where the pellets were rolled into flakes. The flakes were then blown to the entrance of a conveyor-type oven which was set to provide air at 350° F. on entrance and 415° F. at the exit with a residence time of 2½ minutes. The flakes were discharged from this tempering oven at a moisture of about 18.6%. The tempered flakes were dropped into the flash system, which consisted of a hot-air pneumatic conveyor in which the gas-air temperature was between about 650° F. and 750° F. The flakes were separated from the high-velocity air stream in a cyclone-type separator. The product was then dried in another conveyor-type oven set at 350° F. throughout. The product was then dried by a three-minute pass through another conveyor-belt type oven set at 315° F. throughout. The product of this run was a nicely blistered, uniform product having pinhead-type blisters.

Example 2

The process of Example 1 was repeated except that the dough temperature at discharge from the extruder was 225° F. This caused the formation of blown pellets and undesirable end products. After lowering the extrudate temperature to about 205° F., the flake product was satisfactorily blistered.

Example 3

The procedure of Example 1 was repeated, except that the extrudate dough temperature was held at about 100° F. The extrudate was much lighter in color than that of Example 1. The flakes going into the tempering conveyor-belt type oven seemed brittle and dull in appearance. The flakes of Example 3 were opaque; the flakes of Example 1 were translucent. After flash drying, the final product of this example lacked the blister and had a generally undesirable texture.

Example 4

Ninety parts of steel-cut steamed oat groats, 7 parts of white sugar, 2 parts of salt, .04 part of food color and 20 parts of water were charged to a commercial pressure cooker and subjected to 15 p.s.i. pressure cooking conditions for two hours. At the end of this time the oat groats were uniformly cooked, and there was substantially no water phase present with the groats. The groats were found to contain between 40% and 43% moisture. Upon discharge from the cooker the groats dropped in temperature to about 80° F. before they were charged to a 1¼-inch diameter extruder. The extruder jacket temperature was adjusted so that the dough temperature reached 205° F. at discharge. The extruder screw revolved at 60 r.p.m., and the approximate retention time of the cereal in the extruder was 38 seconds. The moisture content of the rope extruded through the die orifice of 3/16-inch was approximately 36% to 38% by weight. The rope was cut by a revolving blade into approximately 3/16-inch lengths. The resulting pellets were dropped into a room-temperature pneumatic conveying system which delivered the pellets to the flaking rolls in between one and two seconds. The flaking rolls were adjusted so that the pellets were rolled to a dough-flake thickness of .011 inch to .012 inch. The dough flakes contained 32% to 34% moisture. The dough flakes were then tempered in a conveyor-type oven by 2¼-minute retention, with air temperatures being 250° F. in and 250° F. out. The tempered flakes contained 13% to 14% moisture. The flakes were then dropped into a high-temperature pneumatic conveying-drying system in which the conveying air was about 500° F. The flakes were separated from the high-temperature air in a cyclone-type separator, and upon discharge from the cyclone the flakes contained 6% to 7% moisture. The flakes were then dried in another conveyor-belt-type oven in which the air was 350° F. going in and 350° F. coming out. After the 2¼-minute retention in this final drying oven the flake product had between 2% and 3% moisture. This product had a uniform toasted color, containing a fine or delicate type blister structure, a pleasing texture and flavor, and was particularly well suited for subsequent enrobing or coating operations.

As illustrated in Example 4, it is preferred that the oat groats be cut before use in the process of this invention when completely uniform penetration of color or flavor additives is desired.

It is clear that Examples 1 and 4 illustrate embodiments of this invention, while Examples 2 and 3 show the undesirable results obtained in processes not in accord with this invention.

In other tests in which oat groats were cooked as in Example 1, and were sent directly to the flaking rolls (without the kneading heat-treatment used in this invention), the resulting toasted oat flake products were too fragile and were very unstable, with respect to keeping qualities and rancidity development.

In still other tests, oat flour was admixed with water and this mixture was kneaded and cooked in an extruder. The extruded cooked dough was pelletized and flaked. The resulting toasted flake products were hard, had a harsh texture, and also exhibited poor storage stability.

Accelerated and room-temperature storage tests of the products of this invention have been carried out. These tests indicate the oat products made in accord with this invention can be stored for longer than nine months without the development of rancidity or other common undesirable characteristics, even though no anti-oxidants were present.

In addition to its unique value in the manufacture of stable, ready-to-eat oat cereals from oat groats, the method of this invention is also useful in the direct manufacture of cereal products from other grains and particularly from grain mixtures without the necessity of first producing cereal flour. For example, a mixture of half whole wheat berries and half corn grits was cooked in a pressure cooker and extruded to form a dough in accordance with this invention. The dough was immediately cut (pelletized) and rolled (flaked) and flash dried as above after tempering. The ready-to-eat multi-grain cereal flake produced in this manner had a pleasing and satisfactory texture, flavor, and stability.

It is apparent that the process of this invention is particularly suited to economical, large-scale manufacturing operations.

We claim:
1. A process for the production of a ready-to-eat oat cereal comprising pressure-cooking oat groats until the starch is gelatinized, kneading the cooked groats at a temperature between about 150° F. and 212° F., thereby forming a plastic cooked oat dough, forming the cooked dough into flakes and flash drying the flakes by contacting the flakes with air at a temperature between about 400° F. and 800° F., thereby producing flakes having a moisture content between about 2% and about 10% by weight.

2. A process for manufacturing a ready-to-eat oat flake comprising pressure-cooking oat groats at less than 25 p.s.i.g. in the presence of water in an amount less than that necessary to provide an unabsorbed water phase, thereby maintaining the substantial integrity of the oat groat structure, said cooking continuing until the starch is gelatinized, kneading and extruding the resulting cooked groats at a temperature between about 150° F. and 212° F., thereby forming a cooked oat dough, immediately forming the cooked dough into flakes, drying the flakes to a moisture content between about 12% and about 30% by weight, flash drying the resulting flakes by contacting the flakes with air at a temperature between about 400° F. and 800° F., said flash drying providing flakes having a moisture content between about 2% and about 10% by weight.

3. A method of manufacturing ready-to-eat oat flakes comprising pressure-cooking oat groats at less than 25 p.s.i.g. in the presence of water in an amount less than that necessary to provide an unabsorbed water phase, thereby maintaining the substantial integrity of the oat groat structure, said cooking continuing until the starch is gelatinized, kneading and extruding the resulting cooked groats at a temperature between about 190° F. and 210° F., thereby forming a cooked oat dough, immediately cutting and rolling the dough into dough flakes having a thickness between about .008 and .015 inch, tempering the dough flakes by drying to a moisture content between about 12.0% and 15.0% by weight, flash drying the resulting tempered flakes by contacting the flake with air having a temperature between about 400° F. and 600° F., said contacting continuing until the flake moisture content is between about 5% and 8% by weight, and finally drying the flake to a moisture content less than about 3% by weight.

4. A method of forming a storage stable ready-to-eat cereal product comprising pressure cooking oat groats at less than 25 p.s.i.g. pressure in the presence of water in an amount less than that necessary to provide an unabsorbed water phase, thereby maintaining the substantial integrity of the oat groat structure, said cooking continuing until the starch is gelatinized, kneading the resulting cooked groats at a temperature between about 150° F. and 212° F., thereby forming a cooked oat dough, extruding and forming the resulting dough into the desired product, and toasting said product with air at a temperature between about 400° F. and 800° F., to give a ready-to-eat cereal product having a moisture content between about 2% and about 10% by weight.

5. A process as in claim 4 in which the discharge temperature after said extrusion is between about 190° F. and 210° F. and in which said tempered flake moisture content is between about 12.0% and 15.0% by weight.

References Cited
UNITED STATES PATENTS

| | | | |
|---|---|---|---|
| 427,159 | 5/1890 | Currie | 99—80 |
| 1,321,754 | 11/1919 | Kellogg | 99—81 |
| 1,435,794 | 11/1922 | Beck | 99—80 |
| 2,552,290 | 11/1951 | Lilly et al. | 99—81 |
| 2,552,291 | 5/1951 | Rupp | 99—80 |
| 2,836,495 | 5/1958 | Thompson et al. | 99—81 |
| 2,998,317 | 8/1961 | Reesman | 99—80 |
| 3,241,978 | 3/1966 | Hreschak | 99—80 |

RAYMOND N. JONES, *Primary Examiner.*